United States Patent
Shin

(10) Patent No.: US 7,212,680 B2
(45) Date of Patent: May 1, 2007

(54) METHOD AND APPARATUS FOR DIFFERENTIALLY COMPRESSING IMAGES

(75) Inventor: Ho-jeong Shin, Bucheon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 718 days.

(21) Appl. No.: 10/355,056

(22) Filed: Jan. 31, 2003

(65) Prior Publication Data

US 2003/0235339 A1 Dec. 25, 2003

(30) Foreign Application Priority Data

Jun. 21, 2002 (KR) .................. 10-2002-0034876

(51) Int. Cl.
G06K 9/46 (2006.01)
G06K 9/68 (2006.01)

(52) U.S. Cl. .................................... 382/246

(58) Field of Classification Search ................ 382/111, 382/162, 164, 165, 218, 219, 232, 236, 244, 382/246, 250, 251, 253, 237; 358/1.1, 515, 358/523, 525, 530, 539; 345/600–604; 348/207.99; 375/240.24
See application file for complete search history.

(56) References Cited

U.S. PATENT DOCUMENTS

| | | | |
|---|---|---|---|
| 3,942,154 A * | 3/1976 | Akami et al. ................ 382/111 |
| 5,164,819 A * | 11/1992 | Music ..................... 375/240.24 |
| 5,333,212 A | 7/1994 | Ligtenberg | |
| 5,383,037 A * | 1/1995 | Kimura et al. .............. 358/539 |
| 5,754,697 A | 5/1998 | Fu et al. | |
| 5,903,671 A * | 5/1999 | Toda .......................... 382/236 |
| 6,628,411 B2 * | 9/2003 | Miller et al. ................. 358/1.1 |
| 2002/0149679 A1 * | 10/2002 | Deangelis et al. ..... 348/207.99 |

FOREIGN PATENT DOCUMENTS

| | | |
|---|---|---|
| JP | 63-76685 A | 4/1988 |
| JP | 8-23550 A | 1/1996 |
| JP | 9-327021 A | 12/1997 |
| KR | 1999-013733 A | 2/1999 |

* cited by examiner

Primary Examiner—Amir Alavi
(74) Attorney, Agent, or Firm—Sughrue Mion, PLLC

(57) ABSTRACT

Provided are an image compression method and apparatus for differentially encoding digital image signals based on a Joint Photographic Experts Group (JPEG) image compression standard. RGB image signals are converted to luminance and chrominance data. Pixels of converted chrominance components are compared, difference values between the compared pixels are obtained, and representative pixel values are determined by comparing the obtained difference value and an allowable error. The representative pixel values are encoded. A data compression ratio can be improved by discrete-cosine-transforming only portions of an image having different colors from a background color.

20 Claims, 4 Drawing Sheets

METHOD AND APPARATUS FOR DIFFERENTIALLY COMPRESSING IMAGES

BACKGROUND OF THE INVENTION

This application claims the priority of Korean Patent Application No. 2002-34876 filed Jun. 21, 2002, in the Korean Intellectual Property Office, the disclosure of which is incorporated herein in its entirety by reference.

1. Field of the Invention

The present invention relates to an image compression system, and more particularly, to an image compression method and apparatus for differentially encoding digital image signals based on a Joint Photographic Experts Group (JPEG) image compression standard.

2. Description of the Related Art

A variety of compression and decompression techniques have been suggested in order to increase transmission efficiency and to easily record/reproduce and process digital image signals when storing the digital image signals in a recording medium or transmitting the digital image signals using a communication cable.

Representative techniques for compressing and decompressing image signals include Motion Picture Experts Group (MPEG) techniques related to compression and decompression of motion pictures and JPEG techniques widely used for compressing and decompressing stationary pictures.

A JPEG standard is used to compress stationary pictures and transmit user images in image telephones using a public switched telephone network (PSTN) in which transmission bandwidth is limited and enables dynamic telecommunication by sequentially transmitting and displaying several image frames.

Also, in digital video recorders (DVRs), a compression method using JPEG compression is employed. Although the compression method using JPEG, which compresses stationary pictures, is simple and efficient, greater improvements in data compression ratio is required to store and sequentially display several frames and to transmit the frames because the compression is for stationary pictures.

FIG. 1 is a block diagram illustrating an image compression method using general JPEG compression. Referring to FIG. 1, a color mode converter 110 converts RGB image data to luminance (Y) and chrominance (Cb, Cr) data. A down sampler 120 leaves luminance components as they are and down samples only chrominance components (Cb, Cr). A discrete cosine transformer (DCT) 130 discrete-cosine-transforms the down sampled image data. A quantizer 140 quantizes the discrete-cosine-transformed image data (DCT coefficients). A Huffman coder 150 variable-length-codes the quantized image data.

Accordingly, stationary images are compressed using such a JPEG format. Here, a predetermined background color exists in a natural image. For example, a background color in an image in which a skier glides down a mountain covered with snow is white. Also, the entire background color in an image showing a sea landscape is blue. However, since an existing JPEG encoding algorithm performs discrete cosine transformation (DCT) of all pixel values representing images, the existing JPEG encoding algorithm is computationally complex, which results in a long encoding time.

SUMMARY OF THE INVENTION

Accordingly, the present invention provides a method and apparatus for differentially encoding images by which a data compression ratio can be improved by performing DCT only for portions of the images having different colors from a background color.

According to an aspect of the present invention, there is provided a method of compressing image data. RGB image signals are converted to luminance and chrominance data. Chrominance components of converted pixels are compared, difference values between the chrominance components of compared pixels are obtained, and representative pixel values are determined by comparing the obtained difference value and an allowable error. The representative pixel values are encoded.

According to another aspect of the present invention, there is also provided an apparatus for compressing image data. The apparatus includes a color mode converter, a representative value determiner, a discrete cosine transformer, a quantizer, and a Huffman coder. The color mode converter converts RGB data to luminance and chrominance data. The representative value determiner compares chrominance components of pixels converted by the color mode converter, obtains difference values between the chrominance components of compared pixels, and determines representative pixel values by comparing the obtained difference value and an allowable error. The discrete cosine transformer discrete-cosine-transforms the representative pixel values of the chrominance data determined by the representative value determiner in each block. The quantizer quantizes the image data discrete-cosine-transformed by the discrete cosine transformer. The Huffman coder variable-length-codes the image data quantized by the quantizer.

BRIEF DESCRIPTION OF THE DRAWINGS

The above aspects and advantages of the present invention will become more apparent by describing in detail preferred embodiments thereof with reference to the attached drawings in which:

FIG. 4 is a view illustrating chrominance data in an 8×8 block to which an encoding method of the present invention is applied.

DETAILED DESCRIPTION OF THE INVENTION

Hereinafter, a preferred embodiment of the present invention will now be described with reference to the attached drawings.

Figure 1:
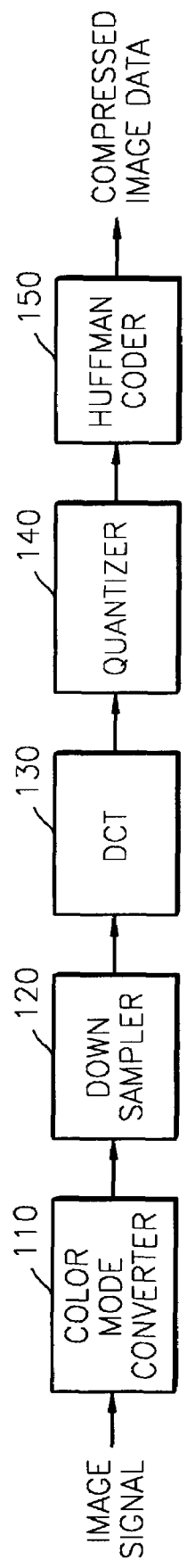
FIG. 1 is a block diagram illustrating a method for compressing an image using a general Joint Photographic Experts Group (JPEG) image compression standard.
Figure 2:
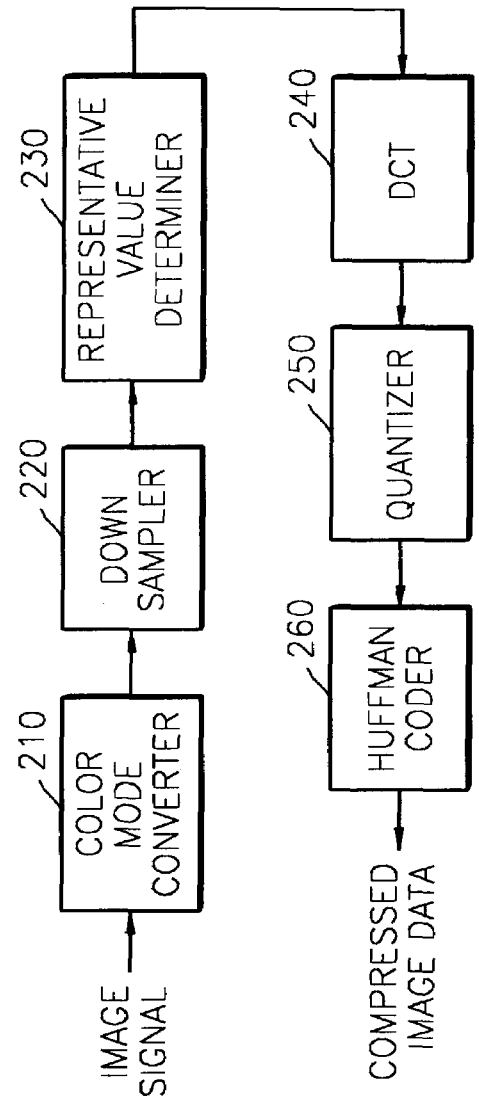
FIG. 2 is a block diagram of a JPEG-based differential encoder according to the present invention.

FIG. 2 is a block diagram of a differential encoder according to the present invention. The differential encoder includes a color mode converter 210, a down sampler 220, a representative value determiner 230, a discrete cosine transformer (DCT) 240, a quantizer 250, and a Huffman coder 260.

Referring to FIG. 2, the color mode converter 210 coverts RGB data to luminance (Y) and chrominance (Cb, Cr) data.

The down sampler 220 leaves luminance components as they are and down samples only chrominance (Cb, Cr) components. In other words, the down sampling of image data reduces chrominance (Cb, Cr) values to which a human being's vision is not sensitive, to half and leaves luminance (Y) information to which a human being's vision is sensitive and which influences image quality, as it is.

The representative value determiner 230 compares the down sampled chrominance data of pixels, obtains difference values between the chrominance data of the compared pixels, and determines representative pixel values by comparing the obtained difference value and an allowable error.

The DCT 240 performs discrete cosine transformation of luminance data and chrominance data determined as representative values in each 8×8 block.

The quantizer 250 quantizes the discrete-cosine-transformed image data (DCT coefficients). Here, quantization is a process of replacing the discrete-cosine-transformed image data with appropriate representative values within a range of an image signal.

The Huffman coder 260 variable-length-codes the quantized image data. This Huffman coding is a type of an entropy lossless compression method in which relatively short code words are assigned to frequently appearing data symbols and long code words are assigned to other data symbols based on statistical information of the data symbols so as to reduce the entire size of the image data.

Figure 3:
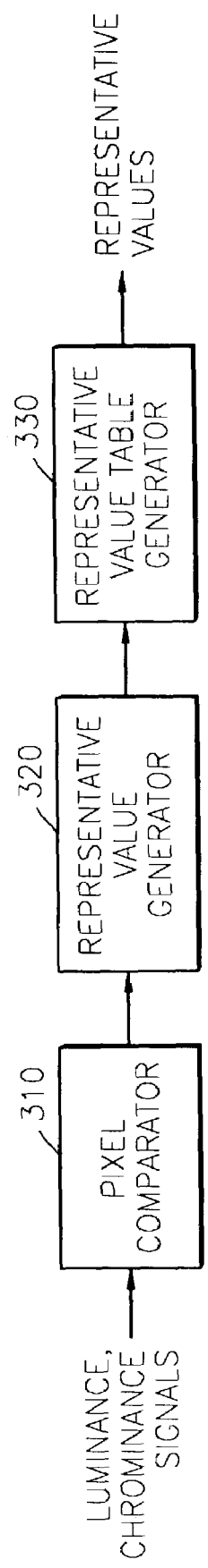
FIG. 3 is a detailed diagram of a representative value generator.

FIG. 3 is a detailed diagram illustrating a representative value determiner. Referring to FIG. 3, a pixel comparator 310 compares chrominance components of pixels. Here, the pixel comparator 310 determines an allowable error suitable for color response sensitivity according to a human being's visual sensation characteristics. For example, when pixel values are compared by determining an allowable error of 3, if a first pixel value is 35, a next pixel value within a range of 35–37 is regarded as 35. Here, as the determined allowable error increases, both an image compression ratio and image loss increases. Therefore, the allowable error is determined in consideration of a trade-off between the image compression ratio and the image loss.

Figure 4:
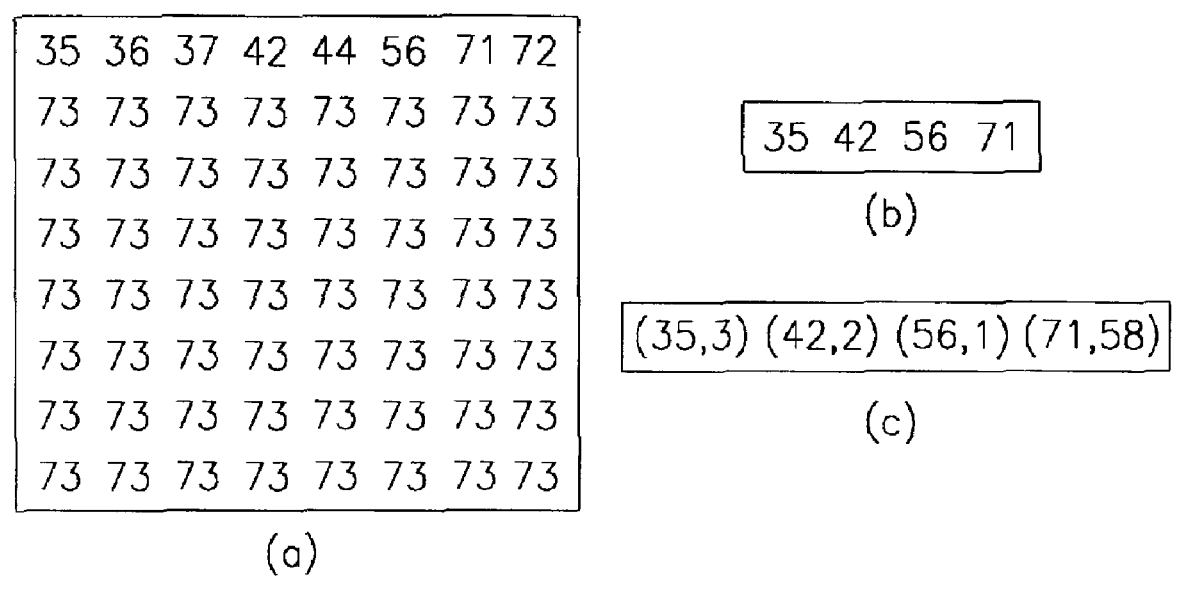

A representative value generator 320 compares the chrominance components of pixels, obtains difference values between the chrominance components of compared pixels, and determines representative pixel values by comparing the obtained difference value and an allowable error. For example, it is assumed that the allowable error is 3 and values of chrominance signals are arranged in the order of "35, 36, 37, 42, 44, 56, 71, 72, 73, . . . " as shown in FIG. 4(a). As such, a first representative value is 35. Next values 36 and 37 may be replaced with the representative value 35. Then, a next representative value is 42 and a value 44 may be replaced with the representative value 42.

A representative value table generator 330 generates a table representing the representative values generated by the representative value generator 320 and information on representative values constituting an image. For example, a table representing the representative values may be generated in the order of "35, 42, 56, and 71" as shown in FIG. 4(b) and a table representing information on the representative values of the image may be generated in the order of "(35, 3), (42, 2), (56, 1), and (71, 58)" as shown in FIG. 4(c). Also, new representative values are added to the tables in ascending order.

Figure 5:
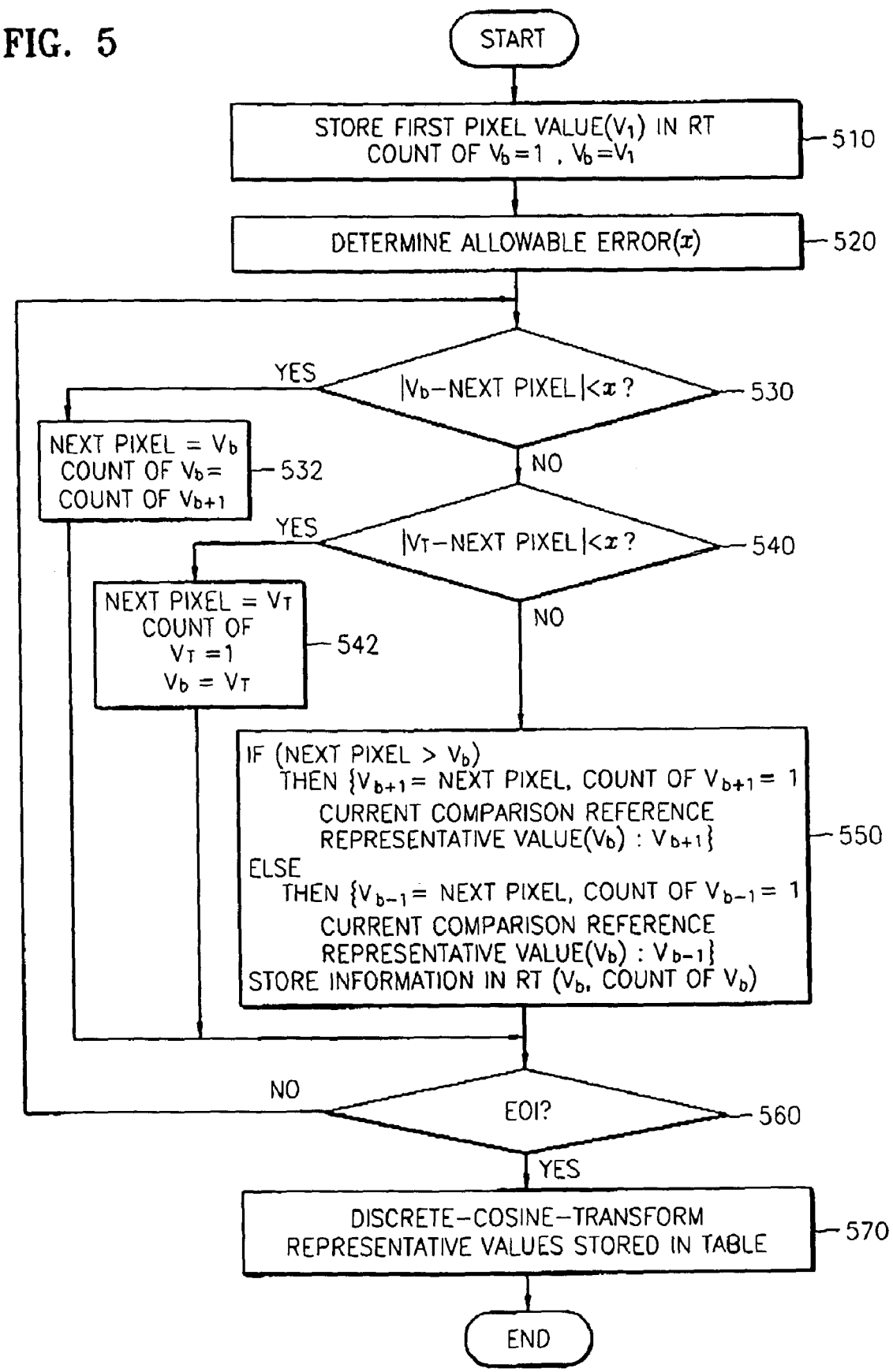
FIG. 5 is a flowchart illustrating a JPEG-based differential encoding method according to the present invention.

FIG. 5 is a flowchart illustrating a JPEG-based differential encoding method according to the present invention. First, representative tables RT are stored in the form of "$V_1$, $V_2$, $V_3$ . . . " and representative information tables are stored in the form of "($V_1$, a), ($V_2$, b), ($V_3$, c), ($V_2$, d). . . "

If chrominance data is input, in step 510, a first pixel value $V_1$ is stored in a representative value table RT and simultaneously used to set a reference pixel value $V_b$ which will be compared with a next pixel value.

Next, in step 520, an allowable error x is determined so as to be suitable for color response sensitivity according to a human being's visual sensation characteristics.

In step 530, a next pixel value is compared with the reference value $V_b$ to determine whether a difference value between the next pixel value and the reference value $V_b$ is within the allowable error x. Here, if it is determined that the difference value between the next pixel value and the reference value $V_b$ is within the allowable error x, in step 532, the reference value $V_b$ is regarded as the next pixel value and the number, or the count, of reference value $V_b$ increases.

In step 530, if it is determined that the difference value between the next pixel value and the reference value $V_b$ is not within the allowable error x, in step 540, representative values in a current representative value table RT are compared with the next pixel to search for representative values within the allowable error x.

Here, if it is found by the comparison of the representative values of the current representative value table RT and the next pixel value that the representative values are not within the allowable error x, in step 550, the next pixel value is stored in the current representative value table RT in ascending order. For example, if the next pixel value is greater than the reference value $V_b$, the next pixel value is stored after a current reference value $V_b$ in the current representative value table RT. If the next pixel value is smaller than the reference value $V_b$, the next pixel value is stored before the current reference value $V_b$ in the current representative value table RT. Also, the stored next pixel value is regarded as a new reference value ($V_{b+1}$ or $V_{b-1}$). The number of the new reference value ($V_{b+1}$ or $V_{b-1}$) is initialized to 1 and information on the number of new reference value ($V_{b+1}$ or $V_{b-1}$) is stored in the current representative value table RT.

In contrast, if in step 540, it is found by the comparison of the representative values of the current representative value table RT and the next pixel value that a representative value is within the allowable error x, in step 542, the representative value stored in the current representative value table RT is regarded as the next pixel value, and the representative value becomes a new reference value $V_T$ and is compared with next pixel values. The number of new reference value $V_T$ is initialized to 1.

Accordingly, in step 560, the representative values of the chrominance data and information related to the representative values are stored in the current representative value table RT until the end of an image block is detected.

Finally, after the end of the image block is detected, in step 570, the representative values of the completed representative value table are discrete-cosine-transformed.

As described above, according to the present invention, a JPEG image has a predetermined background color tone. Also, in an existing JPEG encoding algorithm, DCT operation accounts for 30%–40% of the entire operation time. Accordingly, by discrete-cosine-transforming only portions of an image having different colors from a background color using a differential encoding method according to the present invention, a data compression ratio of the entire image data can be increased and the number of times that DCT is performed can be reduced.

The present invention is not limited to the above-described embodiment and it will be apparent to one of ordinary skill in the art that modifications of the described embodiment may be made without departing from the spirit and scope of the invention. Also, the present invention can be realized as computer-readable code in a computer-readable recording medium. Computer-readable recording media include all kinds of recording apparatuses which store computer-readable data. Computer-readable recording media include ROMs, RAMs, CD-ROMs, magnetic tapes, hard discs, floppy discs, flash memory, optical data storing apparatus, and so forth. Computer-readable recording media also includes apparatuses realized in the form of a carrier wave (e.g., transmission via the Internet). Furthermore, computer-readable recording media can store data distributed in computers connected to each other via a network as code that the computers can read according to a distribution method and execute the code.

What is claimed is:

1. A method of compressing image data, the method comprising:
   (a) comparing chrominance data of pixels, and obtaining difference values between the chrominance data of the compared pixels;
   (b) if it is determined that the difference values between the chrominance data of the compared pixels are within an allowable error, determining a representative pixel value as a pixel, and if it is found by comparison of the representative pixel value and a next pixel value that the representative value is not within the allowable error, setting the next pixel value as the representative pixel value; and
   (c) encoding the representative pixel values.

2. The method of claim 1, wherein step (a) comprises:
   comparing a predetermined pixel value with a reference value to determine whether a difference value between the predetermined pixel value and the reference value is within the allowable error;
   if it is determined that the difference value between the predetermined pixel value and the reference value is within the allowable error, determining the reference value as the predetermined pixel value, and if it is determined that the difference value between the predetermined pixel value and the reference value is not within the allowable error, comparing the representative pixel values with the predetermined pixel value to search for a first representative pixel value of the representative pixel values within the allowable error; and
   if it is found by the comparison of the representative pixel values and the predetermined pixel value that the first representative pixel value is within the allowable error, determining the first representative pixel value as the predetermined pixel value, and if it is found by the comparison of the representative pixel values and the predetermined pixel value that the representative pixel values are not within the allowable error, storing the predetermined pixel value as a representative pixel value.

3. The method of claim 2, wherein when setting the representative pixel value, if the next pixel value is greater than the reference pixel value, the next pixel value is stored after the reference pixel value while if the next pixel value is smaller than the reference pixel value, the next pixel value is stored before the reference pixel value.

4. The method of claim 1, further comprising generating a representative value table in which the determined representative pixel values are arranged in ascending order and a table in which the number of determined representative pixel values is recorded.

5. The method of claim 1, wherein the allowable error is set to be suitable for color response sensitivity according to a human being's visual sensation characteristics.

6. The method of claim 1, further comprising discrete-cosine-transforming the representative pixel values.

7. The method of claim 1 further comprising a step of converting RGB image signals to luminance data and the chrominance data.

8. An apparatus for compressing image data, the apparatus comprising:
   a representative value determiner that compares chrominance data of pixels, obtains difference values between the chrominance data of the compared pixels, if it is determined that the difference values between the chrominance data of the compared pixels are within an allowable error, determines a representative pixel value as a pixel, and if it is found by comparison of the representative pixel value and a next pixel value that the representative value is not within the allowable error, sets the next pixel value as the representative pixel value.

9. The apparatus of claim 8, wherein the representative value determiner comprises:
   a pixel comparator that compares the chrominance data of pixels;
   a representative value generator that obtains difference values between the chrominance data of the compared pixels, and determining representative pixel values by comparing the obtained difference values and an allowable error; and
   a table generator that sequentially arranges the representative pixel values generated by the representative value generator and records information on the representative pixel values.

10. The apparatus of claim 9 further comprising a color mode converter that converts RGB image data to luminance data and the chrominance data.

11. The apparatus of claim 9 further comprising a discrete cosine transformer that discrete-cosine-transforms the representative pixel values of the chrominance data determined by the representative value determiner in each block of image data.

12. The apparatus of claim 11 further comprising a quantizer that quantizes the discrete-cosine-transformed image data.

13. The apparatus of claim 12 further comprising an entropy coder that entropy-codes the quantized image data.

14. The apparatus of claim 13, wherein the entropy coder is a Huffman coder that variable-length-codes the quantized image data.

15. An apparatus for compressing image data, the apparatus comprising:
   (a) means for comparing chrominance data of pixels, and obtaining difference values between the chrominance data of the compared pixels;
   (b) means for, if it is determined that the difference values between the chrominance data of the compared pixels are within an allowable error, determining a representative pixel value as a pixel, and if it is found by comparison of the representative pixel value and a next pixel value that the representative value is not within the allowable error, setting the next pixel value as the representative pixel value; and (c) means for encoding the representative pixel values.

16. The apparatus of claim 15, wherein (a) comprises means for:

comparing a predetermined pixel value with a reference value to determine whether a difference value between the predetermined pixel value and the reference value is within the allowable error;

if it is determined that the difference value between the predetermined pixel value and the reference value is within the allowable error, determining the reference value as the predetermined pixel value, and if it is determined that the difference value between the predetermined pixel value and the reference value is not within the allowable error, comparing the representative pixel values with the predetermined pixel value to search for a first representative pixel value of the representative pixel values within the allowable error; and if it is found by the comparison of the representative pixel values and the predetermined pixel value that the first representative pixel value is within the allowable error determining the first representative pixel value as the predetermined pixel value, and if it is found by the comparison of the representative pixel values and the predetermined pixel value that the representative pixel values are not within the allowable error, storing the predetermined pixel value as a representative pixel value.

17. The apparatus of claim 16, wherein (a) further comprises means for, when setting the representative pixel value, if the next pixel value is greater than the reference pixel value, the next pixel value is stored after the reference pixel value while if the next pixel value is smaller than the reference pixel value, storing the next pixel value before the reference pixel value.

18. The apparatus of claim 15, further comprising means for generating a representative value table in which the determined representative pixel values are arranged in ascending order and a table in which the number of determined representative pixel values is recorded.

19. The apparatus of claim 15, further comprising means for setting the allowable error to be suitable for color response sensitivity according to a human being's visual sensation characteristics.

20. The apparatus of claim 15, further comprising means for discrete-cosine-transforming the representative pixel values.

* * * * *